United States Patent Office 3,395,455
Patented Aug. 6, 1968

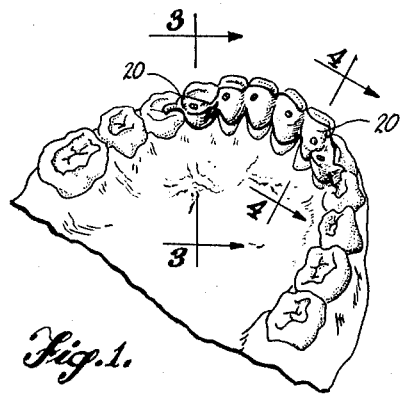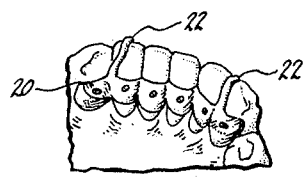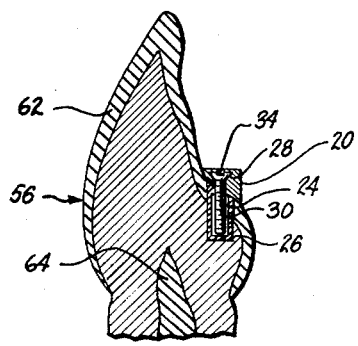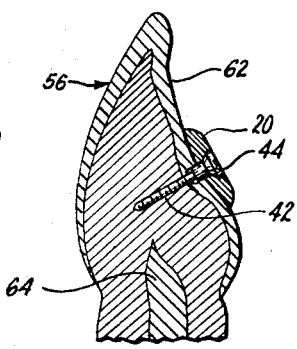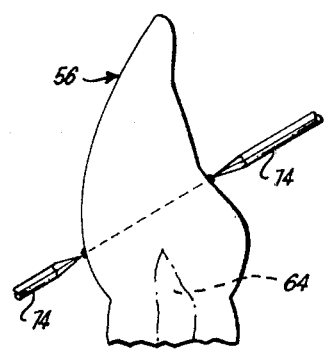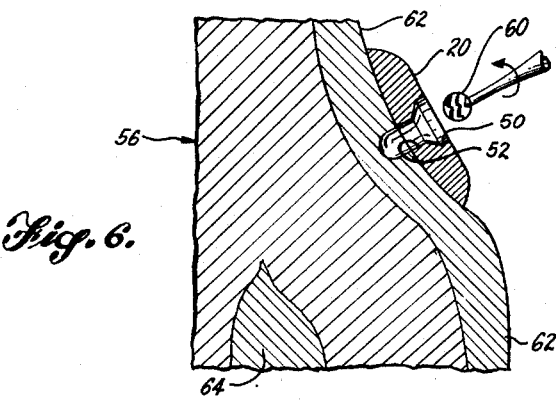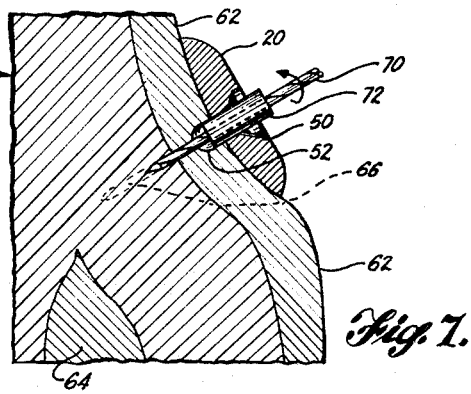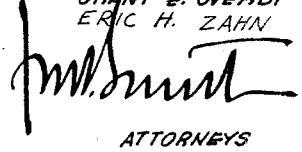

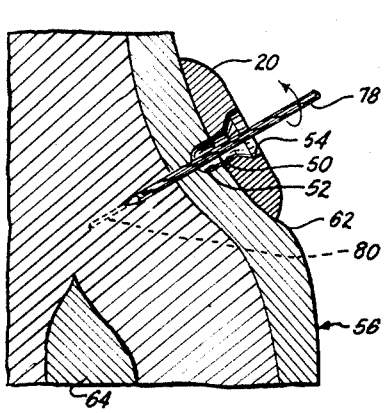
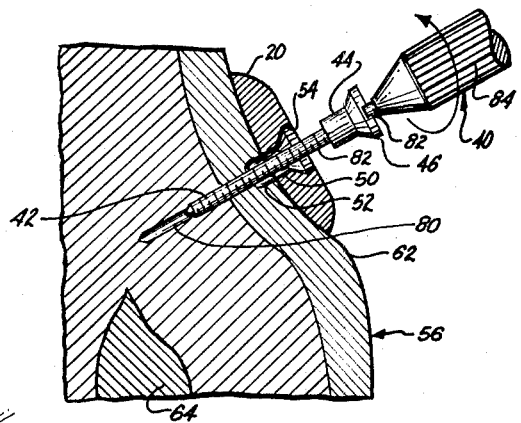
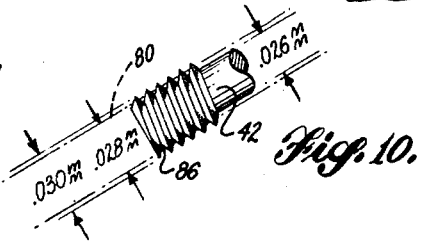
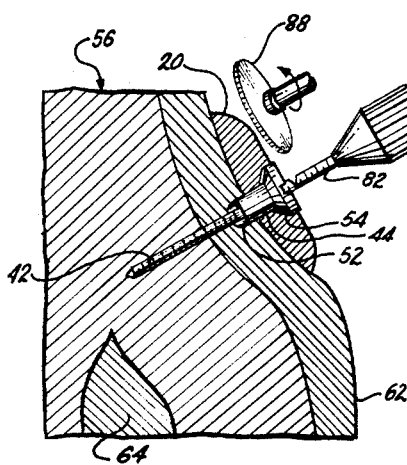
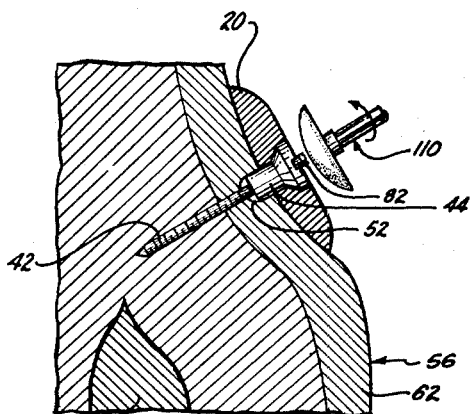
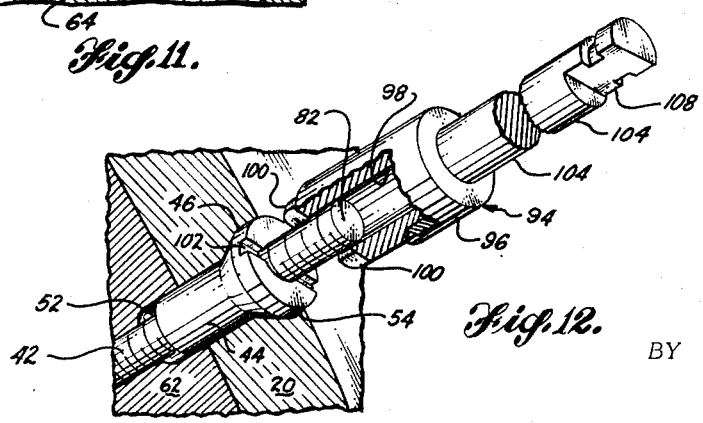
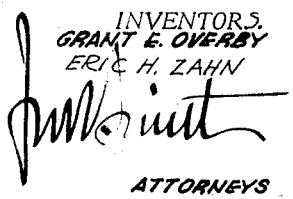

3,395,455
FIXED-REMOVABLE DENTAL SPLINTING METHOD AND THE SPLINTS AND FASTENERS USED IN PRACTICING THE METHOD
Grant E. Overby, 1106 S. 4th St., Tacoma, Wash. 99202, and Eric H. Zahn, 219 Medical-Dental Bldg., Seattle, Wash. 98101
Continuation-in-part of application Ser. No. 138,936, Sept. 18, 1961. This application Mar. 18, 1965, Ser. No. 440,907
3 Claims. (Cl. 32—6)

This application is a continuation-in-part of application Ser. No. 138,936, filed Sept. 18, 1961 entitled, "Structure of and Process for Making Quasi Fixed Partial Denture and Splint," now abandoned.

This invention relates to dental splinting methods, to splints, fasteners, and tools, and to how these are used in practicing the method.

The purpose of this invention is to provide splinting methods, splints, fasteners and tools and their method of use which a dentist employs to care for patient's teeth, for example, during periodontal therapy when provisional splinting is preferred. Such splinting is considered as being fixed from the patient's viewpoint but removable from the dentist's viewpoint.

Although this invention, when fully utilized as indicated in application Ser. No. 138,936, may incorporate provisions for pontics and other partial denture structures, attention, herein, is directed to preserving live teeth by restoring them to full usefulness as an individual tooth or in a group of teeth. The invention has its greatest impact in the practice of dentistry in providing a fixed prosthesis used in the periodontal prosthesis undertaken during periodontal therapy. When periodontal disease is present, there is both loss of natural attachment apparatus and pathologic change in remaining periodontal tissues. These losses induce tooth mobility and migration, further aggravating periodontal breakdown. Therefore, limitation of tooth movement is necessary and essential to arrest continuing periodontal damage and to undertake successful periodontal reattachment. Splinting becomes of extreme importance as a therapeutic adjunct, preventing tooth migration and buttressing weaker teeth to stronger teeth without damaging the latter.

The principles of the illustrated splinting are predicated on the objective of ligating teeth to each other to create a master multi-rooted unit. The resulting increased area of root resistance favorably alters the center of rotation of the individual tooth.

The size of a splint is dependent upon the number and positions of the mobile teeth to be controlled and, as necessary other dental considerations that will be exacted from each individual patient's need for care. Such splinting, as illustrated, also affords the opportunity, not to be gained by other means, for survival of teeth which otherwise would be lost because such teeth were losing natural supporting structure that periodontal therapy alone could not stop.

In the accompanying drawings and throughout the following descriptions: methods of providing intracoronal provisional splints, referred to also as therapeutic appliances themselves; methods of installing fastening means; the fasteners themselves; and tools or instruments; are set forth for better understanding of this invention. In the drawings:

FIGURE 1 is a perspective view of a group of teeth in a jaw some of which are positioned by an intracoronal provisional splint;

FIGURE 2 is a perspective view, somewhat similar to FIGURE 1, showing a group of teeth about to be positioned by an intracoronal provisional splint, which includes hooks that are used temporarily during intallation of the splint;

FIGURE 3 is an enlarged partial section view, taken along section line 3—3 in FIGURE 1, to indicate use of a fastener combining a sleeve and a cap screw to hold the splint in place at this location;

FIGURE 4 is an enlarged partial section view, taken along section line 4—4 in FIGURE 1, to indicate use of a fastener combining a tap screw and a threaded collar to hold the splint in place at this location;

FIGURE 5 is an enlarged partial section view, like section view of FIGURE 4, but of a master stone cast or model of a tooth, indicating how markings are made on it while previously taken roentgenograms are viewed, to determine the desired location and direction of the planned fastener installation;

FIGURE 6 is a further enlarged partial section view, similar to FIGURE 4, showing the splint in position serving initially as a template, and a round carbide burr which has just been used to cut a shallow recess in the tooth enamel;

FIGURE 7 is a further enlarged partial section view similar to FIGURE 4, showing the splint in position, and a guided twist drill in a hole it has made of some depth into the cingulum of the tooth;

FIGURE 8 is an enlarged partial section view, similar to FIGURE 7, showing a regular twist drill being used to continue on the hole to a selected depth of preparation, dotted lines indicating this depth and also the possible size of a pilot hole, sometimes made first when necessary, with a carbide burr;

FIGURE 9 is an enlarged partial section view similar to FIGURE 8, showing the completed hole and the tap screw with its collar being threaded into this hole, indicating also a knurled handle which is initially integrally made with the tap screw to receive torque during the installation;

FIGURE 10 is a partial schematic view of the leading end of the tap screw indicating, by way of an example, the respective diameters of the tooth-hole and tap screw threads;

FIGURE 11 is an enlarged partial section view similar to FIGURE 9, illustrating the tap screw installed and the collar nearly so, and a cutting tool used to cut off the knurled handle portion by severing the tap screw just above the collar;

FIGURE 12 is an enlarged partial perspective view, with some parts broken away, depicting utilization of a driver to tighten the collar into place within the aperture of both the splint and tooth; and FIGURE 13 is an enlarged partial section view similar to FIGURE 11, illustrating the use of a small diamond stone to dress off any portion of the screw remaining beyond the collar.

To better understand these figures and this invention some suggested dental office and laboratory practices are first and subsequently referred to. For example, X-rays should be taken initially to obtain roentgenograms which must be studied and observed to avoid pulp penetration by fasteners. In regard to periodontal therapy, in the dental office mobile teeth of a patient are stabilized with soft stick compound which is adapted to labial or buccal surfaces. Then with impression materials such as hydrocolloid, thiokol rubber, silicone, and alginate are arranged in trays to obtain impressions of both arches. These impressions must clearly record lingual surfaces where the splint, bar or appliance is to be placed. Also the wax bite must be registered for cast articulation.

In the laboratory, using the impressions, a stone model, as noted in FIGURE 1, is poured and cast. Observing the roentgenograms, indelible pencil markings are made on the stone model to indicate where the splint will be seated and where the fasteners will be positioned as noted in FIGURE 5. A wax model of a splint is then formed across the teeth to be included in the splint following the pencil markings. Where necessary, such as at section 3—3 of FIGURE 1 and in FIGURE 2, the wax model is made thicker to accommodate a fastener composed of an inserted sleeve and its cap screw. At other locations such as at section 4—4 of FIGURE 1 and in FIGURE 4, the wax model is thinner but still thick enough to accommodate a fastener composed of a tap screw and its collar. Provision may also be made to provide temporary hooks to be used to hold the splint in place during its installation, as indicated in FIGURE 2.

Using so called investment casting procedures, for example, first melting out the wax model of the splint, appliance or bar and then pouring in a metal alloy such as "vitallium" the cast splint is obtained. Subsequent forming operations to provide apertures and countersunk entry for fasteners, coupled with refinishing operations, complete preparations of the splint. The apertures when formed are aligned to comply with the pencil markings assuring no pulp involvement upon subsequent installation of fasteners. Some aperture alignment aiding steps may be undertaken earlier in preparing the wax model. The resulting bar, appliance, or splint casting with selected fasteners and the master stone model are then ready for use in the dental office upon the patient's return.

When the patient returns, the splint is fitted and, as necessary, reforming by grinding, for example, is undertaken. As shown in FIGURE 1, when the splint 20 fits properly, it is held firmly in place performing an initial and continuing template function. Temporary fitting hooks 22 may be relied upon at this time. The template 20, subsequently, is fastened sufficiently to become the effective splint 20.

Splint fasteners of two types are illustrated. The fastener 24 disclosed in application Ser. No. 138,936, is used, as illustrated in FIGURE 1, at each end of splint 20. Fasteners 24 are installed as indicated in FIGURE 3, which is taken on section line 3—3 of FIGURE 1. A hole is prepared in the tooth using round carbide burrs. First a number one burr is used to a depth of two millimeters into the tooth enamel and then a number five-five-seven burr is used to complete the preparation. Thereafter pre-examination of the proper depth of preparation is made in comparison with the fastener component lengths, primarily considering the length of its sleeve 26 and insuring the seating of screw head 28 in splint 20.

When this pre-examination and prefitting is completed, screw 30 by itself is: dipped into screw lock compound; screwed to a maximum depth in its threaded sleeve 26; and backed off two full turns. Then a creamy mix of crown and bridge cement is made. With the splint 20 remaining in place, this cement is preferably picked up on a periodontal probe and transferred through the splint opening or aperture into the preparation in the tooth. Next, preferably using tweezers, the assembled screw and sleeve are dipped into cement, inserted through splint aperture into the hole in the tooth and seated so that screw head 28 is positioned flush into the splint countersink. An amalgam plugger may be used to maintain firm pressure on the screw until the cement has set hard. The molar and cuspid areas, if involved, should be anchored first. Excess cement is removed as slight polishing is undertaken without obliterating screw head slots 34. Finally screw 30 is tightened to secure firmly splint 20 to the teeth. Subsequently, when necessary, a dentist may remove screw 30 upon applying torque with a screw driver. However, between dental appointments this screw is permanently fixed in place.

The other type of splint fastener is illustrated in FIGURE 1 at section line 4—4 and thereafter in FIGURES 4, 9, 10, 11, 12, and 13. These other fasteners 40 are installed where fastener anchoring portions are limited in size. Dentists prefer to use them because the preparation or hole in the tooth is of less diameter. Fastener 40 is ultimately installed as a tap screw 42 having a tightened threaded collar 44. Collar 44 has a tapered flange 46 which complementarily fits an aperture 50 terminating in a countersunk recess 54 in splint 20 as shown in FIGURES 4 and 13.

The actual installation of these fasteners 40 is undertaken, as illustrated in FIGURES 1, 4, 5, 6, 7, 8, 9, 10, 11, 12, and 13. The splint 20 has been prepared in the manner noted previously and likewise it is positioned to perform initially as a template 20 and subsequently as a splint 20.

As indicated in FIGURE 6 with splint 20 in position and using the selected aperture 50 as a guide, a shallow hole is cut as a counter bore 52 into a patient's tooth 56 substantially on an axis of and at the diameter of the splint aperture 50. Preferably this hole is made by using a number three round carbide burr 60 and penetrating into tooth enamel 62 one half to three quarters of a millimeter.

As shown in FIGURE 7, at this same location on the same axis, a continuing hole 66 as a bore, is drilled into tooth 56 to an approximate depth of one and one half millimeters. Preferably, this bored hole is made by using a self-centering twist drill 70 having a diameter of twenty-eight thousandths of an inch. During this drilling, the self centering bushing 72 on the twist drill 70 should be in contact with both splint aperture 50 and counter bore 52 of tooth 56 to insure maintenance of the correct alignment. By following this procedure non-involvement of pulp 64 of tooth 56 is assured for the original designated alignment of the fastener location, made with the aid of the pencils 74, continues to be followed with accuracy.

Referring to FIGURE 8, the continuation of the bore to a selected required depth of preparation may proceed by using a regular twist drill 78 but recommended practice in regard to hard sound teeth involves first cutting a pilot hole 80. Therefore, a number one-half round carbide burr (not shown) is used to drill a pilot hole 80 to the selected depth of the preparation. Generally a preferred depth is in the range of three to four millimeters deep.

Radial enlargement of this pilot hole 80 is thereafter accomplished by preferably cutting with a regular twist drill 78 having a diameter of twenty-eight thousandths of an inch. This enlargement drilling step concludes the major steps of preparation prior to utilizing a fastener 40. During these procedures, as necessary, there will be various cleaning steps undertaken to provide proper cutting and drilling environments for the burrs and drills used.

FIGURES 9, 10, 11, 12, and 13 which follow illustrate how splint is secured at a location such as at section 4—4 of FIGURE 1, by installing fastener 40. The tap screw 42 portion of this fastener 40 is preferably originally made as illustrated in FIGURE 9. After a selected length of tapping screw threads 82 are made, the body of screw 42 is enlarged to provide a knurled surfaced elongated cylinder 84. In installing fastener 40, equipped with its collar 44 and coated with fresh cement, the dentist with his fingers applies necessary torque to knurled cylinder 84 and consequently to tap screw 42.

As shown in the enlargement of FIGURE 10 tap screw 42, preferably, having a root thread diameter of twenty-six thousandths of an inch and a crest thread diameter of thirty thousandths of an inch, upon tapping into the preferred twenty-eight thousandths of an inch in diameter hole, cuts firm resulting threads. No binding occurs because the clearance provided is adequate to accommodate cutting chips as threading progresses.

When tap screw 42 bottoms in the tooth preparation, completed previously by using twist drill 78, threaded collar 44 is then turned and advanced partially into splint aperture 50, as illustrated in FIGURE 11.

Then cylinder 84 and threaded portions 82 of tapping screw 42 not needed are cut off by preferably using a revolving emery disc cutter 88 as also illustrated in FIGURE 11.

Referring to FIGURES 12 and 13, final threading and tightening of collar 44 in the presence of thread lock coated screw threads is undertaken to fit collar 44 into both splint aperture 50 and counterbore 52. During this threading recesses 52 remaining in the counterbore become filled with excess cement at 90.

The screw driver 94, illustrated in FIGURE 12, is utilized during this final threading and tightening of collar 44 into its holding position shown in FIGURE 13. A knurled enlarged cylindrical end 96 is provided on screw driver 94 to receive torque. This end 96 has a central recess 98 to accommodate the resulting cut end of tap screw 42. Also cylinder 96 has two radial blades 100 to engage kerfs 102 in tapered flange 46 of collar 44 to transmit torque to collar 44. In addition, beyond knurled end 96, this screw driver 94 has a smaller diameter elongated body 104 made integrally with this cylinder 96. This elongated body 104 terminates in interlocking structure 108 which is adaptable to engage complementary interlocking structure on a dental machine (not shown) to receive torque, as necessary.

As the positioning of fastener 40 is completed at this location, bringing the splint 20 into firm engagement with patient's tooth 56, there still may remain some protruding portions of tap screw 42 above collar 44. Preferably these protrusions are polished away using, for example, a diamond stone 110 and indicated in FIGURE 13.

In the splint installation of FIGURE 1, such fasteners 40 and methods of their securement are repeated at all tooth locations intermediate the teeth located at each splint end where fasteners 24 are relied upon. The decision of which fastener, 24 or 40, is to be used is made when determining the splint size to be used. In reviewing an overall splint location, fastener 24, utilizing the sleeve, is preferably secured where the respective tooth is thicker and where an enlarged splint portion may be formed uniformly. In contrast, fastener 40, utilizing the tap screw, is secured where the splint remains thinner closely following lingual surfaces of thinner teeth such as the incisors.

During preparation of a tooth for either fastener, involvement with pulp is avoided and preservation of each tooth is the foremost objective. This objective coupled with the overall purpose of retaining as many natural teeth as possible in a patient's mouth make this invention both as to its method, fasteners, and instruments, an outstanding contribution to the practice of denistry.

We claim:
1. A method of securing an apertured splint to a human tooth, comprising:
   placing the apertured splint against the tooth to serve initially as a template and subsequently to continue in place as a splint;
   cutting a shallow counter bore, in the surface of the tooth in line with the aperture axis;
   drilling a continuing bore coaxial with the counter bore axis into the tooth to a depth required for the specific preparation;
   rotating a threaded, cement-coated screw into the full depth of the continuing bore to bottom the screw in the tooth;
   running an internally threaded flanged collar onto the screw so that the collar flange makes contact with the splint and the collar enters the counter bore of the tooth;
   severing the screw as close as possible to the seated collar; and
   dressing off any portion of the severed screw extending beyond the collar.

2. A splint retaining fastener for securing dental splints to human teeth, comprising:
   a self-tapping screw for insertion of its inner end through a splint aperture into a slightly undersized hole in a tooth;
   said screw having at its outer end an enlarged handle adapted to be manually grasped and rotated to apply threading torque to said screw during its insertion into a tooth;
   a collar threadedly engaged on said screw for axial movement therealong;
   said collar having a flange on that end, adjacent said handle and being provided with radial kerf slots to receive the blade of the rotary-driving tool adapted to sleeve the outer end of the screw when the enlarged handle has been removed therefrom.

3. A splint assembly for use in splinting human teeth, comprising:
   means forming splint structure for placement against human teeth and having aperture alignable with an individual tooth;
   a self-tapping screw for insertion of its inner end through the splint aperture into a slightly undersized hole in the tooth;
   said screw having at its outer end an enlarged handle adapted to be manually grasped and rotated to apply threading torque to said screw during its insertion into the tooth;
   each splint aperture being substantially larger than such screw; and
   a collar threadedly engaged on said screw for axial movement therealong, said collar having a flange on that adjacent said handle and which is larger than said aperture;
   the collar being of a size substantially coextensive with the size of the aperture and being of a length sufficient that when said flange is brought into close bearing relation on the outer surface of the splint, the collar inner end protrudes from the inner surface of the splint;
   the flanged end of said collar being adapted to be engaged by a rotary driving tool when the handle has been removed for rotating said collar on said screw into flange bearing relationship against the outer surface of said splint.

References Cited

UNITED STATES PATENTS

| 2,635,338 | 4/1953 | Dallenbach | 32—5 |
| 1,504,942 | 8/1924 | Comegys | 32—14 |
| 3,092,907 | 6/1963 | Traiger | 32—14 |
| 2,218,631 | 10/1940 | West et al. | 145—50.1 |
| 2,848,024 | 8/1958 | Smith et al. | 145—50.1 |
| 1,105,105 | 7/1914 | Sherman | 128—92 |
| 2,485,531 | 10/1949 | Dzus et al. | 128—92 |

FOREIGN PATENTS 129,955  10/1950  Sweden.

LOUIS G. MANCENE, *Primary Examiner.*
C. R. WENTZEL, *Assistant Examiner.*